Figure 1:
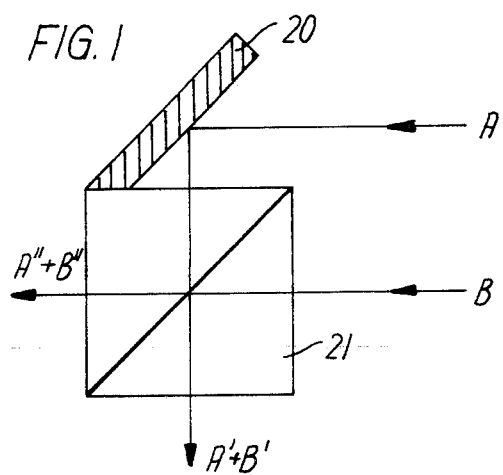

United States Patent [19]

Hanson

[11] Patent Number: 4,572,664

[45] Date of Patent: Feb. 25, 1986

[54] METHOD OF MEASURING VELOCITY GRADIENTS IN A FLOWING MEDIUM AND APPARATUS FOR CARRYING OUT THE METHOD

[75] Inventor: Vagn S. G. Hanson, Fakse, Denmark

[73] Assignee: Forsogsanleg Riso, Roskilde, Denmark

[21] Appl. No.: 479,777

[22] Filed: Mar. 28, 1983

[30] Foreign Application Priority Data

Apr. 7, 1982 [DK] Denmark .............................. 1610/82

[51] Int. Cl.$^4$ ............................................. G01P 3/36
[52] U.S. Cl. .................................... 356/28.5; 356/342
[58] Field of Search ...................... 356/28.5, 336, 338, 356/349, 356, 358, 342, 337; 73/656, 657

[56] References Cited

U.S. PATENT DOCUMENTS 3,547,540 12/1970 Shigemoto .......................... 356/28.5

OTHER PUBLICATIONS

J. W. Foreman et al., *IEE Journal of Quantum Electronics*, Aug. 1966, pp. 260–266.
F. Durst et al., *Principles and Practice of Laser Doppler Anemometry*, 1981, pp. 79, 83.

*Primary Examiner*—S. C. Buczinski
*Assistant Examiner*—Linda J. Wallace
*Attorney, Agent, or Firm*—Beveridge, DeGrandi and Weilacher

[57] ABSTRACT

In a method of measuring velocity gradients in a sample volume (2) in a flowing medium, by which method radiation scattered by particles entrained by the medium and irradiated by spatially coherent electromagnetic radiation, in particular laser light, is detected and measured and the difference in Doppler shift in the radiation from different particles in the sample volume (2) used as a measure of the velocity gradient, an optical element (3) is inserted in the radiation path from particles in the sample volume (2) to the detector (4). The optical element (3) has such properties that essentially only radiation scattered simultaneously from particle pairs in the sample volume (2) spaced apart a distance determined by the optical element (3) are made part of the measuring signals to be combined to form the signal which is a measure of the difference in the Doppler shifts and thereby of the velocity gradient in the sample volume (2) defined by the measurement points.

The optical element (3) may for example be an optical grating of the absorption, phase or reflection type or intermediate forms, a birefringent element, a Bragg cell, a combination of a totally reflective surface and a beam splitter or possibly a glass plate having one of its surfaces coated with a totally reflective material.

The apparatus comprises a source for electromagnetic radiation (1), a detector (4) for receiving radiation scattered from particles in a sample volume (2), means for recording the output signals from the detector (4) and an optical element (3) of the above-mentioned type defining the position of a relevant particle pair.

21 Claims, 7 Drawing Figures

METHOD OF MEASURING VELOCITY GRADIENTS IN A FLOWING MEDIUM AND APPARATUS FOR CARRYING OUT THE METHOD

The invention relates to a method of measuring velocity gradients in a sample volume in a flowing medium, by which method radiation scattered by particles entrained by the medium and irradiated by spatially coherent electromagnetic radiation, in particular laser light, is detected and measured and the difference in Doppler shift in the radiation from different particles within the sample volume used as a measure of the velocity gradient.

Measurement of velocity gradients in flowing media is of importance in particular in the study of turbulent flows. Such studies are carried out e.g. in the construction of ship hulls, airplanes, airscrews, wind mills, propellers, turbines, motor cars, pipe parts, gas and fluid exhaust members, combustion chambers of internal combustion engines, nozzle burners, etc.

The theories and mathematical models relating to turbulent flow are comparatively incomplete and verification is difficult precisely on account of problems in connection with the measurement of velocity gradients. Consequently, it has up till now been necessary in practical construction work to use time consuming and expensive model experiments and testing of prototypes in wind tunnels, tanks and the like.

Such experiments, however, give no information on the reason behind a successful or unsuccessful experiment.

It is therefore of both theoretical and technical interest to develop the theory of turbulent flow and in this connection to provide methods of experimental mapping of velocity fields and their development as a function of time in order to test the theory.

In recent years it has become usual to use Laser Doppler anemometry in the measurement of flow velocities in flowing media, in particular since this method does not cause alterations in the flow due to the insertion of probes or the like in the medium.

The principle in Laser Doppler anemometry is the radiation scattered by a particle moving at the velocity of the flowing medium shows a change in frequency, the Doppler shift which is proportional to the velocity of the particle and thereby is a measure of the flow velocity of the medium.

In the sample volume used, many particles move at slightly different velocities distributed about an average velocity and thus give rise to a frequency spectrum of a certain extent. It is possible to measure the average velocity and the degree of turbulence which reflects the velocity variations in the sample volume.

Attempts have also been made at developing methods of measuring velocity gradients by means of anemometers.

Mishina and Asakura have in Japan J. Appl. Phys., 15, No. 10, pages 2001–2002(1976) described a method using two sample volumes both determined by means of laser beams and for instance spaced 20 $\mu$m apart. The purpose is to study the flow of blood in biological living tissue by means of a laser Doppler microscope thereby measuring inter alia the velocity gradient in the blood stream in capillaries having a diameter of about 10 $\mu$m.

M. Fermigier et al. disclose in Appl. Phys. Lett., 36(5) pages 361–363(1980) a method using two lasers for measuring transverse velocity gradients and laminar and turbulent diffusion. A pulsed laser "writes" in a flowing liquid a phase grating which afterwards is "read" by forming its diffraction image by means of a second laser.

G. G. Fuller et al describes in J. Fluid Mech., 100(3) pages 555–575(1980) an experimental method which, however, is complicated and difficult to reproduce. It is based upon the classical homodyne principle applied to a flowing suspension, use being made of a correlation function including the result of measurements of scattered laser light from particles in the suspension by means of a detector provided with photomultiplier tubes. The experimental measurements which are carried out in laminar flows are to serve as a support for a theory based upon the above-mentioned scattered light spectrum and wherein the effect of various types of linear flow fields, particle diffusion and the intensity profile in the sample volume is included.

None of the methods used till now is suitable for practical use outside the laboratory. An object of the present invention is to provide a method and an apparatus suitable for practical use, which is flexible in that it can be adapted in a simple manner to solve various tasks and is simple and easy to operate.

In the method according to the invention an optical element is inserted in the path of the radiation from particles in the sample volume to the detector which optical element has such properties that essentially only radiation scattered simultaneously from particle pairs in the sample volume spaced apart a distance determined by the optical element are made part of the measuring signals to be combined to form the signal which is a measure of the difference in the Doppler shifts and thereby of the velocity gradient in the sample volume defined by the measurement points.

Thus it is made possible to measure the velocity difference between two particles in the sample volume used in the process, and thereby to determine not only the average velocity and degree of turbulence, but also the variations in the velocity field in the sample volume.

An optical element having the stated properties may, e.g. be an optical grating of the absorption type, the phase type, the reflection type, suitably designed, intermediate forms, a Bragg cell or a birefringent element, such as a Wollaston or a Rochon prism. Or it may be a combination of a total reflective surface and a beam splitter, or a glass plate which on one side is coated with a totally reflective material.

The use of such optical elements which accurately determine the spacing between the particles from which the measured radiation is scattered allows a simple adaption to the task concerned, since the optical element in possession of the desired properties is chosen according to the task to be performed. Furthermore, it makes it easy to measure gradients in different directions and also to measure the total velocity, as will be explained in the following.

An apparatus for carrying out the method according to the invention comprises a source of electromagnetic radiation, especially a laser, and a detector for receiving scattered radiation originating from particles in a sample volume and means for recording the output signals from the detector, and is characterized by an optical element in the radiation path from the sample volume to the detector, which optical element has such properties and is arranged in such manner that part of the radiation originating from two particles occurring simultaneously in the sample volume and mutually spaced a distance determined by the optical element has parallel phase surfaces after having passed the optical element and by the detector is converted into an electric signal representing the difference in the Doppler shift between the two particles.

The optical element used according to the invention is preferably a grating of the absorption type, reflection type, phase type or intermediate forms thereof. It can be manufactured in various ways, which will be explained in the following, but should be designed in consideration of the task to be performed.

A consequence of the use of such an optical element in the method in question in connection with a detector system known from Laser Doppler anemometry is that radiation scattered from two particles occurring simultaneously in the sample volume at the correct mutual distance defined by the optical element will leave the element with almost parallel phase surfaces. The result is that in the detector output a powerful signal, a so-called "burst" occurs from which by means of an analysis corresponding to the one used for recording the Doppler shift in ordinary Laser Doppler anemometry, the difference in Doppler shift between the radiation from the two particles is found, which difference is proportional to the velocity difference between the two particles. By division by the known distance between the two particles which distance is determined by the data of the optical element, the velocity gradient is then obtained.

The optical elements used according to the invention may, e.g. be manufactured as described by E. Wolf in "Progress in Optics", Vol. XII: "Recent Advances in Phase Profiles Generation", by exposure of a photographic film with two mutually coherent spherical waves. The density pattern on the photographic film will correspond to the interference pattern between the two fields.

In practice, the filters can be produced by dividing the light from a laser into two beams which appear to originate from two different places in the space and by directing them towards a photographic plate of the type used for taking holograms. After development one of the following processes can be used:

the plate is used directly as an absorption filter, the photographic emulsion is bleached away, whereby the information is retained as a variation in the optical path length by the passage of light through the plate, as in a phase grating, or a reflective metallic layer is vaporized onto the plate, whereby the information lies in the phase of the reflected light.

The optical elements can, for example, also be manufactured according to the method described by E. Wolf in "Progress in Optics" Vol. II: "Ruling, Testing and use of Optical Gratings for High Resolution Spectroscopy.", i.e. mechanically, the phase or amplitude information being engraved by digital control after computing the curve shape.

Furthermore, as already mentioned, use can be made of a birefringent prism, e.g. of the Wollaston or Rochon type, or of a Bragg cell.

In these and other manners, two different types of optical elements can be made:

(a) line grating having a grating constant g (number of lines per meter) of either the absorption type or the phase type. This includes also a birefringent prism having the angle $\Omega$ between the ordinary and the extraordinary pencil of rays.

(b) Rotational symmetric absorption mask having the transmission function $$T(r) = T_o[1 + t_1 \cos(\gamma r^2 + \delta)]$$

where $T_o$, $t_1$, $\gamma$ og $\delta$ are constants and r is the radial coordinate, or rotational symmetric phase mask having the optical path length S(r)

$$S(r) = S_o[1 + s_1 \cos(\gamma r^2 + \delta)]$$

where $S_o$, $s_1$, $\gamma$ og $\delta$ are constants.

An optical element of the type (a) will, when placed at the lens in the detector system, cause the frequency shifted light from two particles in the sample volume at the distance L from the optical element and having the mutual distance $\Delta q$ $\Delta q = g\lambda L$ for the grating, and $\Delta q = \Omega L$ for the prism where $\lambda$ is the wave length of the light used, to assume a constant phase difference over the area of the detector, whereas, when placed in the focal plane of the lens, it will be the light from particles in the measurement volume hving the mutual distance $\Delta q$ $\Delta q = g\lambda f$ for the grating, and $\Delta q = \Omega f$ for the prism where f is the focal length of the lens, which will have a constant phase difference over the area of the detector.

An optical element of type (b) will, when placed by the lens in the detector system, cause light from two particles having the mutual distance $\Delta p$ in the direction of the optical axis $$\Delta p = \frac{\lambda \gamma L^2}{\pi} \text{ for placing by the lens}$$

$$\Delta p = \frac{\lambda \gamma f^2}{\pi} \text{ for placing in the image plane,}$$

where $\lambda$, $\gamma$ and f are defined above, and which both are placed in the direction of propagation of the scattered light between the sample volume and the detector, to assume a constant phase difference over the area of the detector.

In addition to these types of optical elements where the spacing is dependent of the wave length and which are here designated "angular elements", other types may also be used in the method of the invention, e.g. as previously mentioned a combination of a mirror with a beam splitter, or a glass plate having a reflective layer, in which types the spacing is independent of the wave length and which are here designated "distance elements".

Such "distance elements" when placed by the lens in the detector system or in its focal plane will cause light from particles in the sample volume spaced apart $\Delta p = d_o$ and $\Delta p = d_o L/f$ respectively, where $d_o$ is given for the individual optical element, to assume a constant phase difference over the area of the detector.

Two positions of the optical element in the light path between the sample volume and the detector are mentioned above. In principle, the optical element may be placed arbitrarily in this light path, but for practical reasons and especially in order to avoid noise in the detector signal the above-mentioned positions are the preferred ones.

The spacing Δq or Δp between the two particles scattering the light which is measured will by use of optical elements manufactured as described hereinbefore generally be greater than 10 μm, typically from 10 μm to 20 cm and preferably from 100 μm to 1 cm.

The type of detector which can be used in an apparatus according to the invention can be of any conventional type, provided it is a squaring device.

For carrying out the invention use may for instance be made of a laser of any type, although a laser having two or more powerful emission lines, e.g. an Ar-laser, is to be preferred for some applications.

Figure 2:
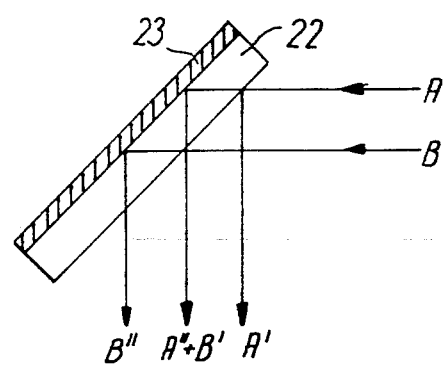
Figure 3:
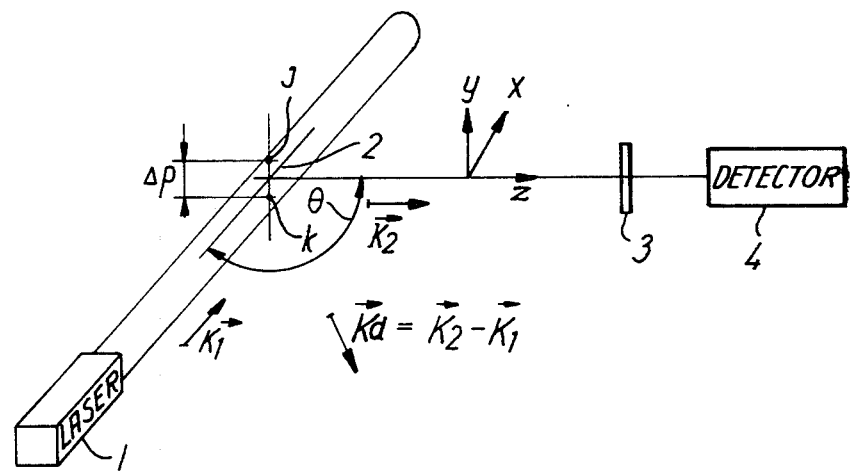
Figure 4:
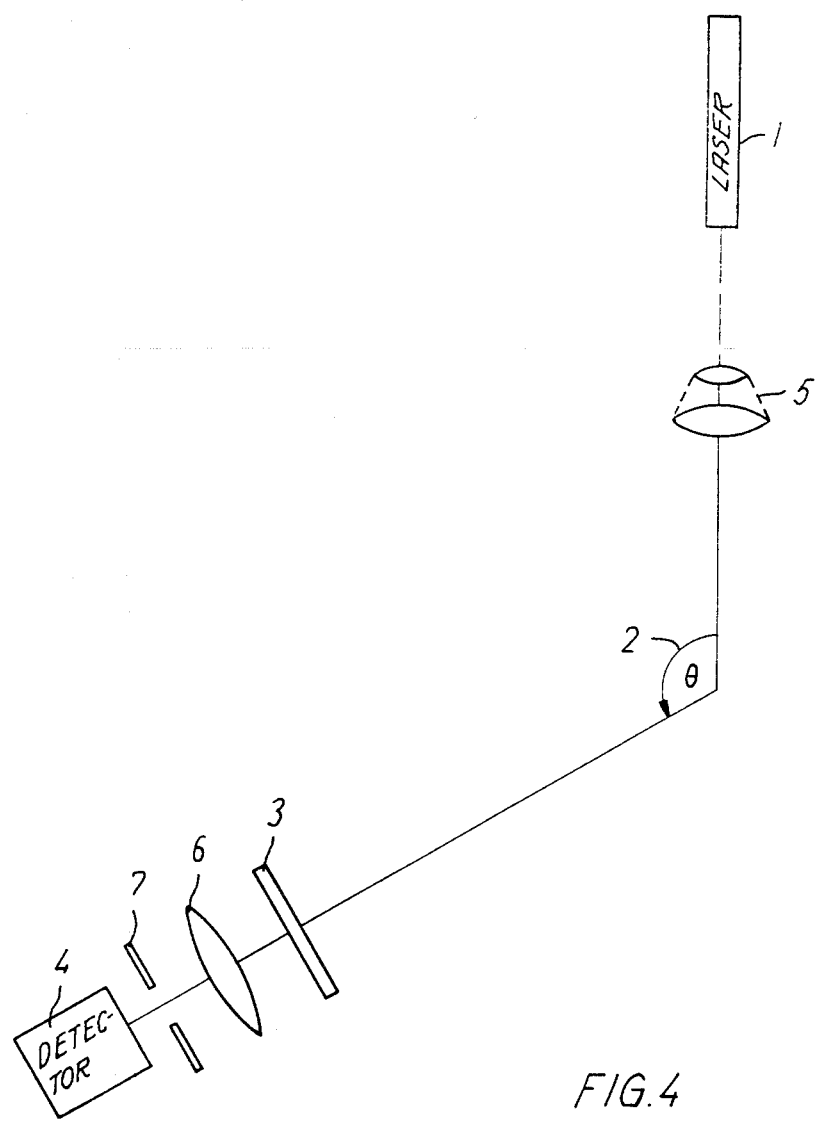
Figure 5:
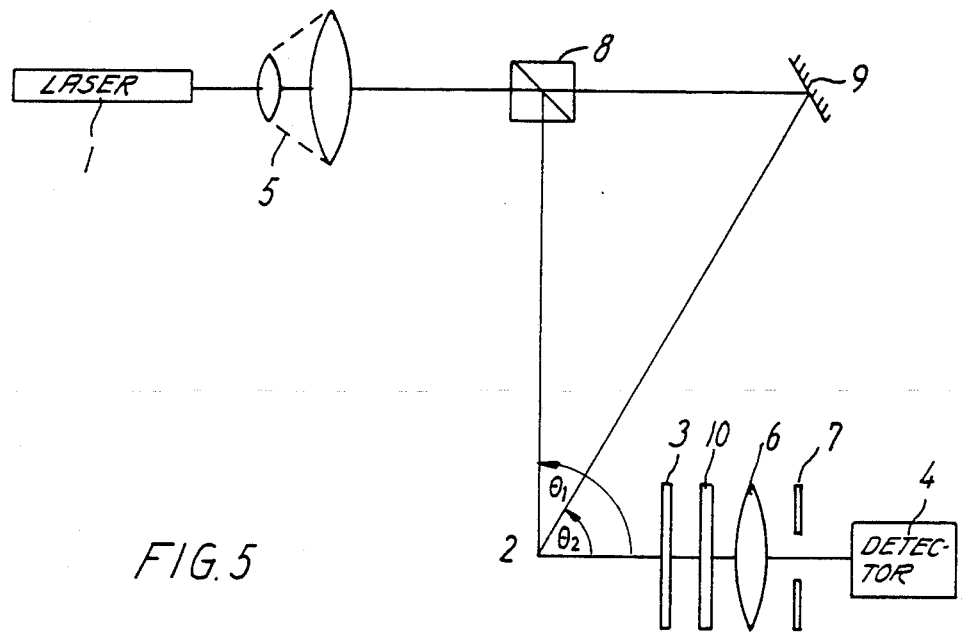
Figure 6:
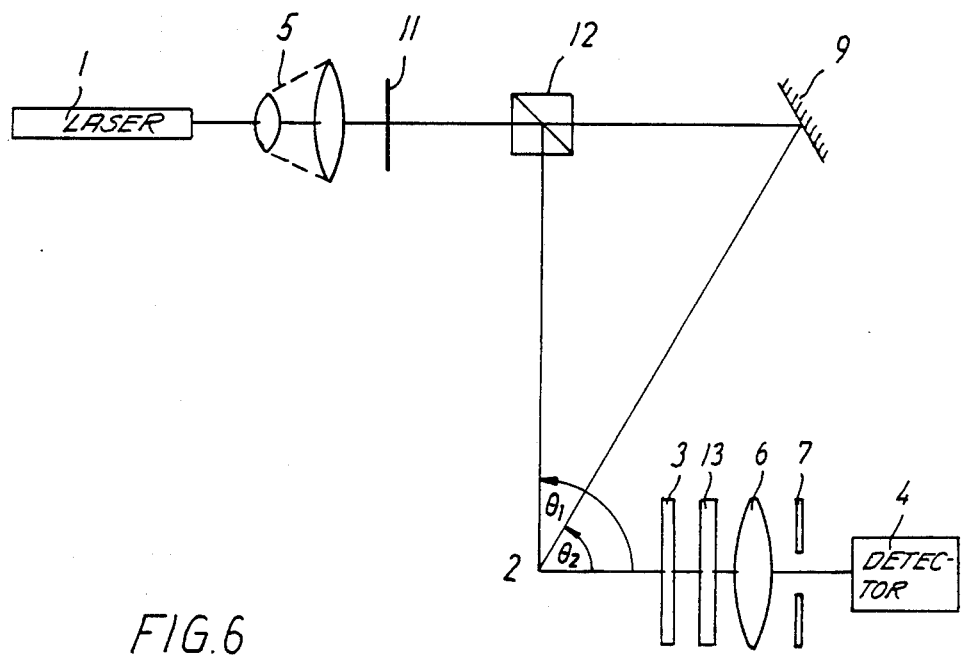
Figure 7:
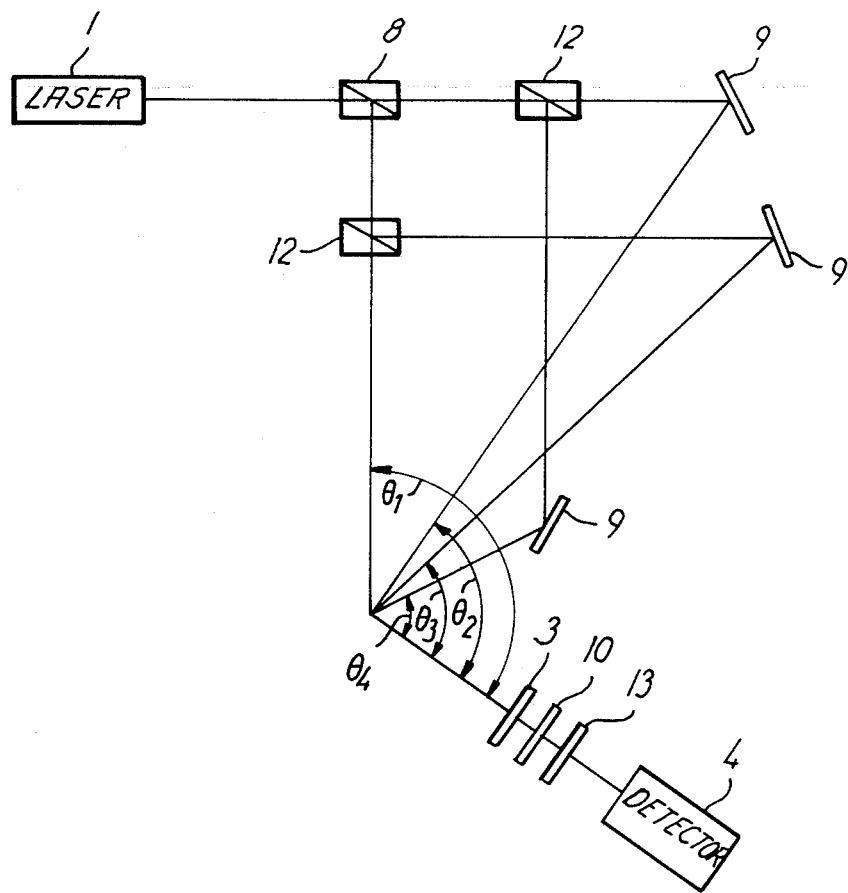

The invention will in the following be explained in more detail with reference to the schematic drawings in which FIG. 1 shows an embodiment of an optical element for use in carrying out the invention in question and consisting of a combination of a mirror and a beam splitter, FIG. 2 is another embodiment of an optical element for use in carrying out the invention and consisting of a glass plate having a reflective layer, FIG. 3 is a basic diagram to serve as a basis for explaining the process according to the invention in measuring velocity gradients in flowing media, FIG. 4 is a diagram of an embodiment of an apparatus according to the invention for measuring one component of the velocity gradient, FIG. 5 is a corresponding diagram for an apparatus according to the invention for measuring two components of the velocity gradient, FIG. 6 is a diagram of a further embodiment of an apparatus according to the invention for measuring one velocity component and two components of the velocity gradient, and FIG. 7 is a diagram of a further embodiment of an apparatus according to the invention for simultaneous measurement of the velocity gradients and two components of the flow velocity vector.

FIG. 1 shows an embodiment of an optical element of the "distance element" type which can be used for carrying out the process according to the invention. This element consists of a mirror 20 and a beam splitter 21 and it is designed so that two light beams A and B originating from a particle pair having the mutual distance $d_o$ in the sample volume, are superposed by means of the optical element in which the light beam A is reflected by the mirror 20 down to the beam splitter 21 and there is divided into two light beams A' and A", while the light beam B is divided by the beam splitter 21 into two light beams B' and B".

Thus for particle pairs in the sample volume at a mutual distance $d_o$, two sets of superposed light beams are formed, A'+B' and A"+B", respectively, which can be led to the detector and will have a constant phase difference over the area of said detector.

With the distance element shown in FIG. 1 the distance $d_o$ between the particles can be varied by displacing the mirror 20 towards and away from the sample volume on the surface of the beam splitter 21.

FIG. 2 shows another embodiment of a distance element for use in the invention consisting of a glass plate 22 which is provided on one side with a reflective layer 23. Two light beams A and B from a particle pair in the sample volume mutually spaced the distance $d_o$ are superposed by means of the optical element in which they are on the surface of the glass plate 22 divided into two beams each A' and A" and B' and B", respectively, where the beams A' and B' are reflected while the beams A" and B" continue through to the reflective layer 23 where they are reflected. For the given distance $d_o$ the two beams A" and B' are thereby juxtaposed into a beam A"+B' which can be conveyed to the detector with constant phase difference over its area.

The same references are used in all the figures for the same components.

FIG. 3 shows a laser 1 emitting a laser beam which reaches a sample volume 2 as a parallel beam with a wave vector $K_1$ having a frequency $\omega_o$. In the sample volume 2 the laser light is scattered in all directions by particles entrained by the flowing medium. That part of the light scattered in a scattering angle of $\theta$ and with a wave vector $K_2$ impinges an optical element 3 disposed at a distance L from the sample volume 2 in the light path from the sample volume 2 to a detector 4.

This light is composed of scattered light from all particles i, j . . . in the sample volume each having their own velocity, $V_1$, $V_j$, . . . resulting in a frequency shift, e.g. $\Delta\omega_j$ of the amount $$\Delta\omega_j = (K_2 - K_1) \cdot V_j = K_d \cdot V_j$$

where $K_d$ is the differential vector between $K_2$ and $K_1$, for the light emitted from each particle with the scattering angle $\theta$, and is thus composed of light having many different frequencies containing information about the velocity field of the flowing medium.

The optical element 3 which is designed as previously mentioned now has the effect that only the light scattered by two particles j and k simultaneously positioned with the distance relation Δq or Δp determined by the optical element in the sample volume impinges the detector 4 with a constant phase difference over its area. The frequency shift $\Delta\omega_{j,k}$ is thereby measured having the size $$\Delta\omega_{j,k} = \Delta\omega_j - \Delta\omega_k = K_d \cdot (V_j - V_k) = K_d \cdot \Delta V_{j,k}$$

where $\Delta V_{j,k}$ for the particle pair j and k is the velocity difference vector for light emitted from the two particles j and k.

As the dot product between two vectors is equal to the length of one vector multiplied by the projection of the second vector on the first one, the measured signal is thus proportional to the projection of the velocity difference vector $\Delta V_{j,k}$ on the difference vector $K_d$ $$\Delta\omega_{j,k} = K_d \cdot V_{j,k} = |K_d| |\Delta V_{j,k}| \cos \phi$$

where $\phi$ is the angle between the two vectors, and therefore the velocity gradient $\partial v_\alpha / \partial \beta$ can be determined by using the optical element 3. In the expression $\partial v_\alpha / \partial B$ $v\alpha$ is the component of the flow velocity in the direction a which has the same directions as $K_d$ and therefore can be adjusted through the scattering angle $\theta$ and where the coordinate B which has the same direction as the connecting line between the two particles j and k is given by the optical element 3.

In FIG. 3 is shown a coordinate system which is convenient for explaining the method and to which reference is made in the following description of apparatus shown in FIGS. 3-6. In this coordinate system the z axis follows the optical axis of the detector 4, so that the x,z-plane corresponds to the plane of the paper sheet and the y axis is at right angles to this plane. The origin of the coordinate system can be chosen arbitrarily on the optical axis of the detector 4.

FIG. 4 shows a simple embodiment of an apparatus for carrying out the method according to the invention. The apparatus is composed of a laser 1 which through a telescope 5 enlarging the diameter of the laser beam emits light towards a sample volume 2 where the light is scattered.

The light scattered in the direction $\theta$ from the sample volume 2 reaches the optical element 3 disposed according to the invention, which enables a measurement of velocity gradients. The light passing through the optical element 3 is focussed by a lens 6 on the aperture of a diaphragm 7 for screening light from areas outside the sample volume 2 and finally hits the detector 4.

By means of this apparatus it is possible with an optical element of the grating type or a birefringent prism to measure the velocity gradient $$(\partial v_\alpha / \partial x)$$

(reference is made to the coordinate system of FIG. 3), in the case of an element of the grating type, by placing said grating so that the grating lines are perpendicular to the x axis and flush with the x,y plane, and in the case of a prism, by placing said prism so that the ordinary and extraordinary beams both are in the x,z plane. By rotating afterwards the element 90° about the z axis, one can measure $$(\partial v_\alpha / \partial y)$$

A subsequent use of a rotational symmetric optical element 3 renders possible a measurement of $$(\partial v_\alpha / \partial z)$$

Finally, a change of the scattering angle $\theta$ by displacing one or more of the components of the apparatus enables a measurement of velocity gradients for a plurality of velocity components $V_\alpha$.

By using angular elements manufactured as combinations of the above-mentioned ones, measurements can be made in arbitrary directions.

FIG. 5 shows an embodiment of an apparatus according to the invention where use is made of a laser 1 having two powerful emission lines, e.g. an Ar-laser of wave lengths $\lambda_1 = 488$ nm and $\lambda_2 = 514$ nm. After passing through the telescope 5, the light hits a wave length dependent prism 8 which deflects light having one wavelength, e.g. $\lambda_1$ and allows the unobstructed passage of light of wavelength $\lambda_2$. By means of a mirror 9 the light of wavelength is reflected so as to produce a common sample volume 2 where the light is scattered with scattering angles $\theta_1$ and $\theta_2$ respectively relative to the detector. For measurement on each wavelength $\lambda_1$ and $\lambda_2$, an interchangable interference filter 10 is disposed between the optical element 3 and the lens 6.

By means of this apparatus it is possible without moving any of the components of the apparatus to measure the velocity gradients for two different velocity components corresponding to the two scattering angles $\theta_1$ and $\theta_2$.

FIG. 6 shows a further embodiment of an apparatus according to the invention where the linearly polarized laser light from the laser 1 after its passage through the telescope 5 hits a $\lambda/4$-plate 11 and is changed into circularly polarized light which continues to a polarizing beam splitter 12 allowing the vertically polarized part of the light to pass ubobstructed, while the horizontally polarized part is deflected. The vertically polarized light is then reflected by the mirror 9 so that a common sample volume 2 is formed.

The placing of a polarizing filter 13 after the optical element 3 makes it possible, as in the apparatus of FIG. 3, to measure the velocity gradients corresponding to the two scattering angles $\theta_1$ and $\theta_2$ by measuring either the horizontally or the vertically polarized light.

By rotating the polarizing filter 13 so as to measure on both the horizontally and the vertically polarized light, it is furthermore possible, as in ordinary Laser Doppler anemometry, to measure the velocity component parallel to the difference vector between the two wave vectors entering the sample volume 2, by removal of the element 3.

In FIG. 7 is shown a further embodiment of the apparatus according to the invention, which is a combination of the apparatus shown in FIGS. 5 and 6 where use is made of a laser 1 having two powerful emission lines, e.g. the same Ar-laser as in FIG. 5. The light from said laser 1 hits a wavelength dependent prism 8 which deflects light having one wavelength e.g. $\lambda_1$ and allows the unobstructed passage of light of wavelength $\lambda_2$. The two rays of light continue in each case to a polarizing beam splitter 12 allowing the vertically polarized light to pass unobstructed, while the horizontally polarized light is deflected. Thereby four rays of light are created, which by means of mirrors 9 are directed towards a common sample volume, where the light rays are scattered with scattering angles $\theta_1$, $\theta_2$, $\theta_3$ and $\theta_4$ relative to the detector 4.

For measurement on each wavelength $\lambda_1$ and $\lambda_2$ an interchangeable interference filter 10 is inserted between the optical element 3 and the detector 4, and for measurement on either the horizontally or the vertically polarized light a polarizing filter 13 is inserted between the optical element 3 and the detector 4.

With this apparatus it is possible to measure the velocity gradients corresponding to the four scattering angles and the two velocity components of the velocity vector corresponding to the two different vectors between the two sets of wave vectors corresponding to $\theta_1$ and $\theta_3$, and $\theta_2$ and $\theta_4$, respectively, by removing the optical element 3, as explained in connection with FIG. 6.

In the figures of the drawing the optical element 3 is shown placed in front of the lens 6. However, as mentioned before, the position of the optical element 3 in the light path between the sample volume 2 and the detector 4 is not critical for the method of the invention.

Besides the embodiments of the apparatus according to the invention which are shown in the drawing, many other types can be designed, e.g. by use of a laser having more than two powerful emission lines to form more than two scattering angles for simultaneous measurement of the flow velocity vector and the velocity gradients.

I claim:

1. A method of measuring velocity gradients in a sample volume in a flowing medium, by which method radiation scattered by particles entrained by the medium and irradiated by spatially coherent electromagnetic radiation, in particular laser light, is detected and measured and the difference in Doppler shift in the radiation from different particles in said sample volume used as a measure of the velocity gradient by inserting in the path of radiation from said sample volume to a detector an optical element having such properties that essentially only radiation scattered simultaneously from particles in particle pairs in said sample volume spaced apart a distance determined by said optical element are made part of the measuring signals to be combined to form the signal which is a measure of said difference in the Doppler shifts and thereby of the velocity gradient in said sample volume defined by the measurement points.

2. Apparatus for measuring velocity gradients in a sample volume in a flowing medium comprising a source of electromagnetic radiation, especially a laser, means for directing said electromagnetic radiation towards said sample volume, a detector for receiving scattered radiation originating from particles in said sample volume, means for recording output signals from said detector, and an optical element in the radiation path from said sample volume to said detector, which optical element has such properties and is arranged in such manner that part of the radiation originating from two particles occurring simultaneously in said sample volume and mutually spaced a distance determined by said optical element has parallel phase surfaces after having passed said optical element and by said detector is converted into an electric signal representing the difference in the Doppler shift between said two particles.

3. Apparatus according to claim 2 in which said optical element is chosen from the group consisting of a grating of the absorption, phase, reflection type and intermediate forms; a birefringent element; and a Bragg cell.

4. Apparatus according to claim 3 comprising in the radiation path a telescope immediately after said source of electromagnetic radiation, and a lens and an aperture in front of said detector.

5. Apparatus according to claim 2 in which said optical element is chosen from the group consisting of a combination of a mirror and a beam splitter; and a glass plate having a reflective layer.

6. Apparatus according to claim 5, comprising in the radiation path a telescope immediately after said source of electromagnetic radiation, and a lens and an aperture in front of said detector.

7. Apparatus according to claim 2 in which said source of electromagnetic radiation is a laser emitting a light beam having at least two distinctly different frequencies, and comprising a beam splitter dividing the laser light into at least two rays of radiation with different wave length, means for directing these rays onto said sample volume and interference filters in the path of radiation from said sample volume to said detector for optional exclusion of light having other frequencies than the desired.

8. Apparatus according to claim 7 in which said optical element is chosen from the group consisting of a grating of the absorption, phase, reflection type and intermediate forms; a birefringent element; and a Bragg cell.

9. Apparatus according to claim 8 comprising in the radiation path a telescope immediately after said source of electromagnetic radiation, and a lens and an apparatus in front of said detector.

10. Apparatus according to claim 7 in which said optical element is chosen from the group consisting of a combination of a mirror and a beam splitter; and a glass plate having a reflective layer.

11. Apparatus according to claim 10 comprising in the radiation path a telescope immediately after said source of electromagnetic radiation, and a lens and an aperture in front of said detector.

12. Apparatus according to claim 2, in which said source of electromagnetic radiation is a laser emitting a polarized light beam, and comprising a plate and beam splitter in the radiation path from the laser to the sample volume dividing said beam into two beams having each its own type of polarized light, means for directing said two beams onto said sample volume, and a preferably rotatable polarizing filter in the radiation path between said sample volume and said detector.

13. Apparatus according to claim 12 in which said optical element is chosen from the group consisting of a grating of the absorption, phase, reflection type and intermediate forms; a birefringent element; and a Bragg cell.

14. Apparatus according to claim 13 comprising in the radiation path a telescope immediately after said source of electromagnetic radiation, and a lens and an aperture in front of said detector.

15. Apparatus according to claim 12 in which said optical element is chosen from the group consisting of a combination of a mirror and a beam splitter; and a glass plate having a reflective layer.

16. Apparatus according to claim 15 comprising in the radiation path a telescope immediately after said source of electromagnetic radiation, and a lens and an aperture in front of said detector.

17. Apparatus according to claim 7, in which said laser emits polarized light, and comprising a plate and beam splitter in the radiation path from said laser to said sample volume thus dividing said beam into at least four rays of radiation with different combinations of wave length and polarization, means for directing said rays of radiation onto said sample volume and a preferably rotatable polarizing filter in the radiation path between said sample volume and said detector.

18. Apparatus according to claim 17, in which said optical element is chosen from the group consisting of a grating of the absorption, phase, reflection type and intermediate forms; a birefringent element; and a Bragg cell.

19. Apparatus according to claim 18 comprising in the radiation path a telescope immediately after said source of electromagnetic radiation, and a lens and an aperture in front of said detector.

20. Apparatus according to claim 17 in which said optical element is chosen from the group consisting of a combination of a mirror and a beam splitter; and a glass plate having a reflective layer.

21. Apparatus according to claim 20, comprising in the radiation path a telescope immediately after said source of electromagnetic radiation, and a lens and an aperture in front of said detector.

* * * * *